United States Patent
Fukuoka

[15] 3,672,078
[45] June 27, 1972

[54] FOOTWEAR

[72] Inventor: Tatsuo Fukuoka, 3,3-Ban, 2-chome Shin-Minami-Fukushima, Tokushima Japan

[22] Filed: June 23, 1970

[21] Appl. No.: 49,042

[52] U.S. Cl. ........................................................... 36/11.5
[51] Int. Cl. ..................................................... A43b 3/12
[58] Field of Search ........................... 36/11.5, 2.5 R, 14, 32

[56] References Cited

UNITED STATES PATENTS

| | | | |
|---|---|---|---|
| 3,147,559 | 9/1964 | Bingham | 36/14 |
| 3,468,040 | 9/1969 | Fukuoka | 36/11.5 |
| 2,374,487 | 4/1945 | Jayne | 36/32 |
| 2,580,245 | 12/1951 | Rollman et al. | 36/14 |
| 3,552,039 | 1/1971 | Fukuoka | 36/11.5 |
| 3,228,124 | 1/1966 | Schwarz | 36/11.5 |
| 3,323,233 | 6/1967 | Scholl | 36/11.5 |

Primary Examiner—Patrick D. Lawson
Attorney—Dawson, Tilton, Fallon & Lungmus

[57] ABSTRACT

A method for producing an injection molded article comprises positioning pre-formed sections made of cloth or the like in the cavity of an injection mold, injecting the molten resinous material into the remainder of the cavity and cooling the material to a condition under which the latter is cured and integrally connected to the pre-positioned sections. The article produced by the above method comprises at least sections and connecting - members adapted to connect said sections to each other.

3 Claims, 16 Drawing Figures

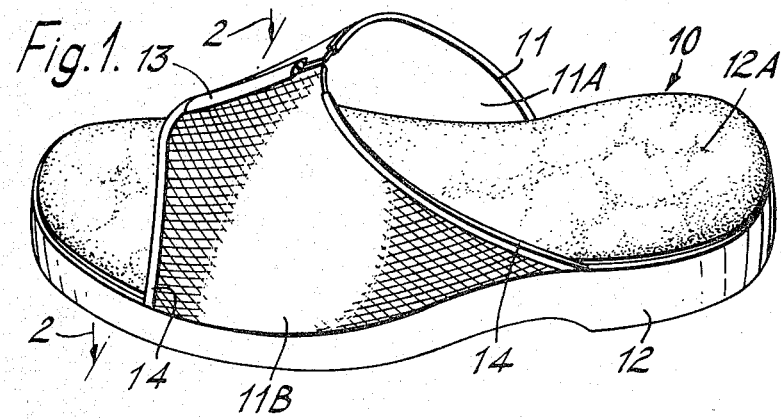
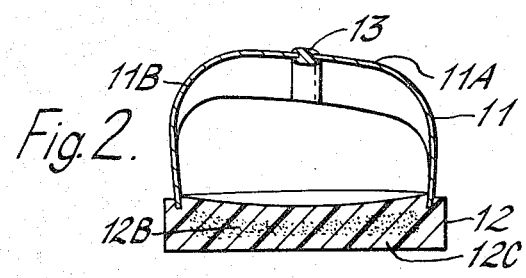
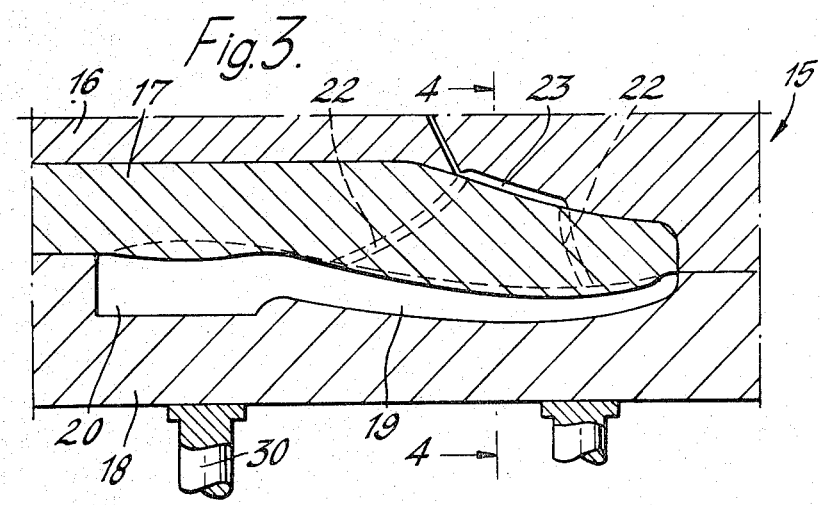

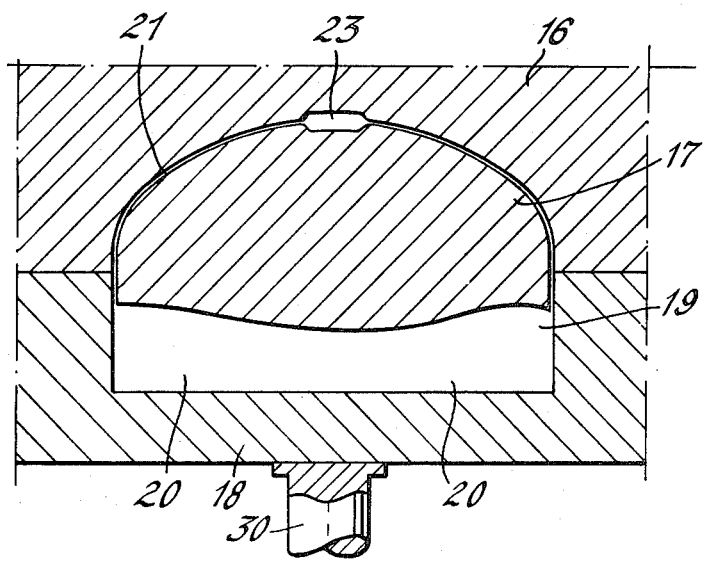
Fig. 4.
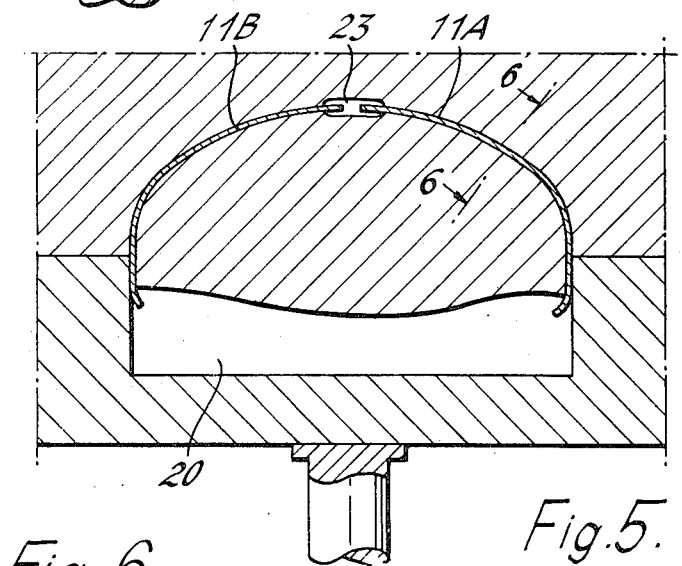
Fig. 5.
Fig. 6.
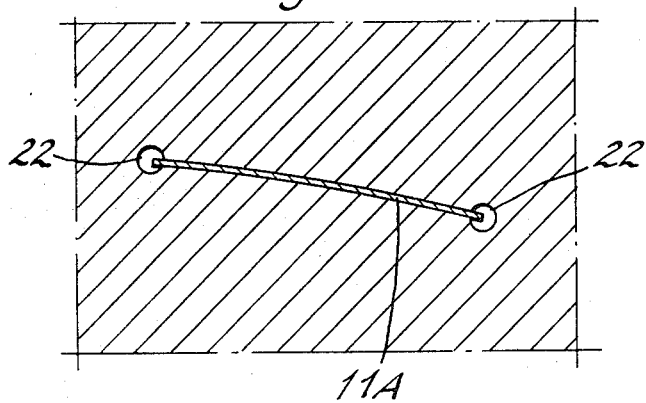

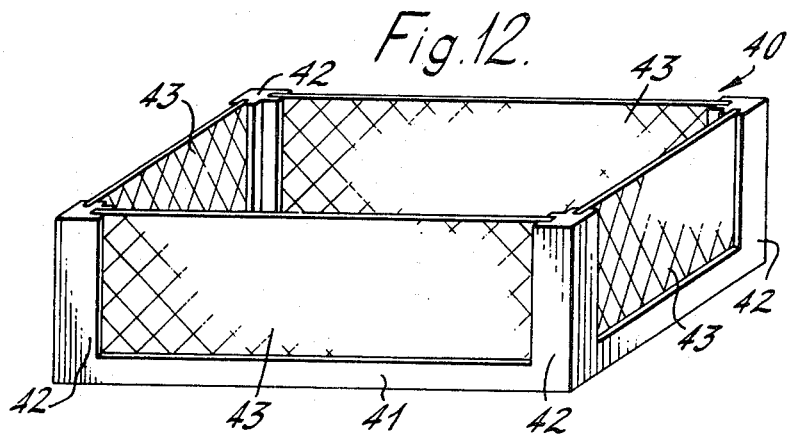
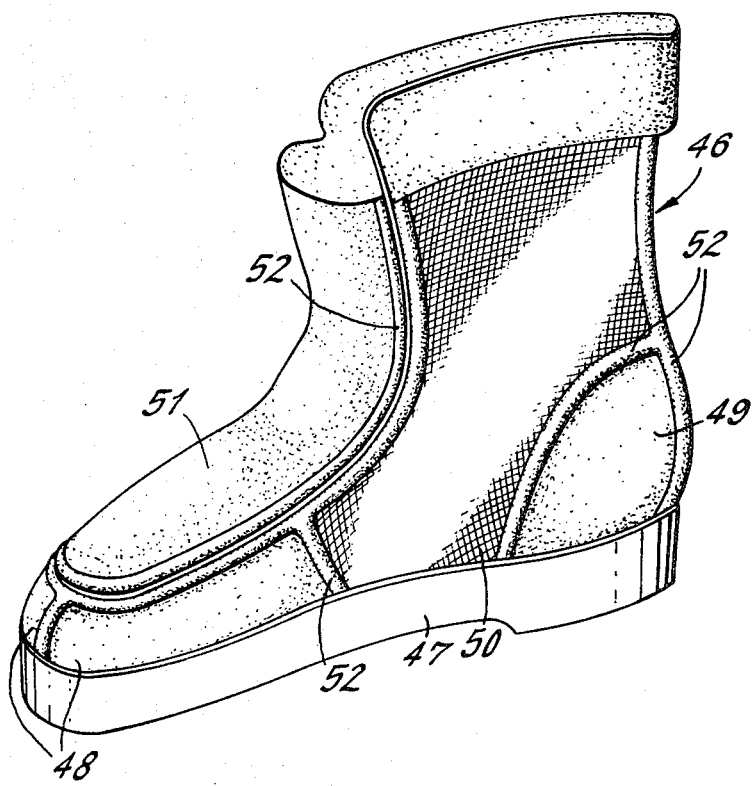

FOOTWEAR

The present invention relates to improvements of injection molded article such as footwear, container and the like and a method therefor, more particularly to low cost but comfortable footwear integrally formed of synthetic resin material and other material such as cloth, leather or the like.

A main object of the present invention is to provide a new injection molded article of which a portion or portions is made of thermoplastic resinous material and other portion or portions being of different material such as cloth, leather or the like, these portions being integrally assembled into an united article such as footwear, container or the like without use of any adhesive agent or stitching up to each other.

A further object of the present invention is to provide a novel footwear such as a sandal, a shoe or the like in which a sole portion thereof is molded of thermoplastic resinous material, and an upper portion being made of different material from the former, such as porous woven cloth, skin, leather or the like, said sole and upper portions being formed as an integrally united footwear without use of any adhesive agent or stitching up to each other.

Another object of the present invention is to provide a novel footwear in which a sole portion is molded of thermoplastic resinous material, having a foaming interior adapted for providing resiliency and having a non-foamy outer layer adapted for providing durability and resistance against deformation thereof.

A further essential object of the present invention is to provide an improved method for producing such articles.

Other objects and advantages of the present invention will appear from the following disclosure of preferred embodiments taken in connection with the attached drawings, in which:

FIG. 1 is a perspective view of the sandal according to the present invention;

FIG. 2 is a sectional view of the sandal taken along the line 2—2 in FIG. 1;

FIG. 3 is a longitudinal sectional view of a mold available for producing the sandal;

FIG. 4 is an enlarged sectional view taken along the line 4—4 in FIG. 3;

FIg. 5 is a sectional view similar to the FIG. 4, but the band sections inserted into the fixed places with the mold;

FIG. 6 is a sectional view taken along the line 6—6 in FIG. 5;

FIG. 12 is a perspective view of the container according to the present invention;

FIG. 15 is a perspective view of the semi-boot according to the subject invention.

Figure 7:
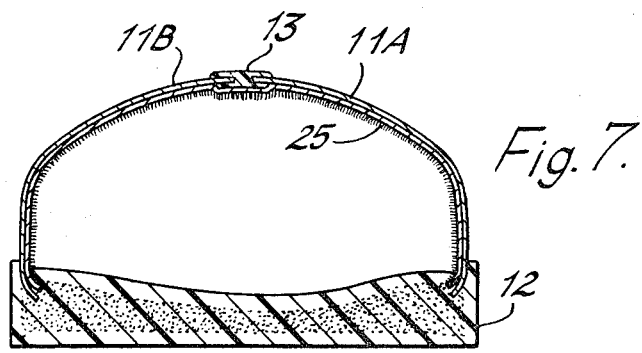
FIG. 7 is a sectional view of other embodiment of the sandal according to the present invention.

Referring now to the drawings 1 and 2, a sandal is illustrated as an embodiment of the article according to the present invention.

The sandal 10 comprises a band member 11 formed of two band sections 11A and 11B, and a base portion or sole member 12 having an unique upper surface 12A formed in a curved shape in conformity with the back figure of the user's sole. The said sections 11A, 11B of the band member 11 are made of flexible material such, for example, as porous woven or knitted cloth, skin, haired sheet, or leather, synthetic resin or the like and are integrally connected to each other at upper end thereof by means of a connection 13. Each of other end portions or lower end portions of the band sections 11A, 11B is embedded into the matrix of the sole member 12 so that the latter and the band member 11 are integrally connected to each other. Preferably, side edges of the band sections 11A and 11B are covered with loop-like flanges 14, respectively, which are integrally formed with the sole member 12. The said flanges 14 and the connection 13 are adhered to the band sections during forming process of the sandal while the process will be hereinafter represented in detail.

The sole member 12, preferably is provided with a foamy interior portion 12B adapted for providing resiliency and a non-foamy outer layer 12C integral therewith adapted for providing durability and resistance against deformation of the sandal.

FIG. 3 to 6 show a mold 15 for producing the sandal. The mold comprises several mold sections, that is, upper mold section 16, a core mold section 17 and a lower mold section 18. These sections are separably assembled so as to define a molding chamber or cavity 19 therein. The said cavity 19 includes a sole-molding chamber 20 adapted for producing the sole member 12 of the sandal, a band-supporting spaces 21 to closely support therein the pre-formed band sections 11A and 11B, a pair of flange-forming chambers 22 adapted for producing the flanges 14 around the sides of the band sections and a connection-forming chamber 23 adapted for producing the connection between the adjacent edges of the band sections, said chambers being communicated to each other to allow the flow of thermoplastic material applied into the cavity 19 through a duct 24. The said lower mold section 18 is supported to move towards up and down by plungers 30 which are actuated by suitable mechanical means (not shown), and the core mold section 17 also being removably supported by the conventional suitable means (not shown).

In producing the sandal, the pre-formed band sections 11A and 11B of the desired material such, for example, as porous woven cloth are positioned within the appropriate spaces 21 in the mold. In this case, the size of each band section is so defined that when each of the band sections are positioned in the appropriate space 21 the adjacent edges or upper edges of the sections 11A and 11B are protruded into the connection-forming chamber 23 as shown in FIG. 5, and the side edges of the sections being protruded into the flange-forming chambers 22 as shown in FIG. 6, while the lower portions of the sections being protruded into the sole-molding chamber 20 as shown in FIG. 5. After positioning the sections 11A and 11B, heated and molten thermoplastic resinous material which can be expanded or foamed is injected from a injection molding apparatus (not shown) into the enlargeable cavity 19 through the duct 24.

The material within the cavity is then cooled and cured by making heat-exchange to the mold 15 which may be cooled by means of the conventional cooling device mounted onto the mold, so that the flanges 14 and the connection 13 which are made of said thermoplastic resinous material integrally with the sole member 12 are fused to the appropriate edges of the band sections 11A and 11B without use of any adhesive agent thereby easily obtaining the sandal provided with the above-mentioned construction as illustrated in FIGS. 1 and 2.

A number of various thermoplastic resinous material may be applicable to the novel foamed material utilized in the present invention. Without intending to be restricted thereto, however, the invention is particularly adapted to be formed of granules of polystyrene. The blowing agents employed for the expansible thermoplastic resinous material may be those which are commonly utilized including dichlorodifluoromethane, carbon dioxide, pentane and other low boiling hydrocarbons or other suitable materials such as sensitive gas generating agents and the like.

To form the foamed material, the preferred method comprises charging a mass of the said granules into a dischargeable injection chamber of the injection molding apparatus; then, in intermittent molding cycle, forcing said mass under pressure sequentially in and through a first cold zone in said injection chamber wherein a portion of said mass is compacted in solid granular form while being maintained at a temperature beneath its foaming temperature; a second heated zone adjacent to the first zone in said injection chamber wherein a portion of said mass is heated to a flowable condition under the application of an adequate quantity of heat to cause it to attain a foaming temperature; the solid compacted portion of the mass in the first zone continuously maintaining the heated portion of said mass in the second zone to restrain substantial foaming therein; and a discharge zone in said injection chamber from which a portion of said heated mass is injected to fill the enlargeable cavity 19 wherein the injected mass is initially exteriorly cooled by the mold to form a solidified surface layer while being maintained under pressure; and finally relieving the pressure and enlarging the cavity to permit the central, relatively uncooled heated mass to expand and force the solidified surface layer against the enlarged confining limit of the cavity to form said sandwich construction molded foam structure.

Figure 8:
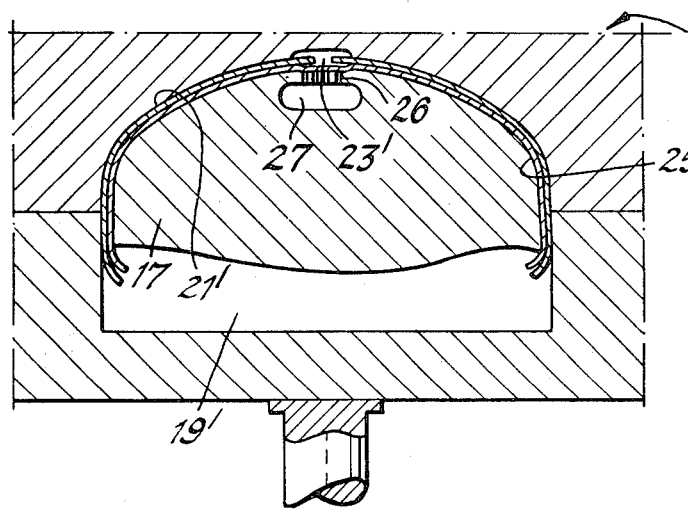
FIG. 8 is a sectional view of a mold available for producing the sandal illustrated in FIg. 7.

FIg. 7 shows a modified sandal according to the present invention in which a rear cover member 25 preferably made of fur or haired sheet is inseparably secured onto the back surface of the band member 11 so as to facilitate the most suitable function even during the cold winter together with the enhanced comfort. In producing this typed sandal, the rear cover member 25 is positioned in a spaces 21' of a mold 15' together with the band sections along the back surfaces thereof before the thermoplastic resinous material is injected into a cavity 19' of the mold 15' as shown in FIG. 8. The mold 15' illustrated in FIg. 8 is constructed in similar fashion to the mold 15, but distance between inner and outer surfaces of each of the spaces 21' is somewhat larger than that of the space 21 to allow insertion of the rear cover member 25 together with the band sections. Further, the inner surface of a connection-forming chamber 23' is provided with a plurality of suction openings 26 which are communicated with a suitable vacuum pump (not shown) through a manifold 27 formed in the core mold sections 17. Thus, when the rear cover member 25 is inserted in the spaces 21' across the connection-forming chamber 23', a central portion of the cover member 25 sat in the chamber 23' may be downwardly withdrawn by feeding suction air from the openings 26, whereby the cover member 25 can be mounted onto the back surface of the band member as shown in FIG. 7.

Figure 9:
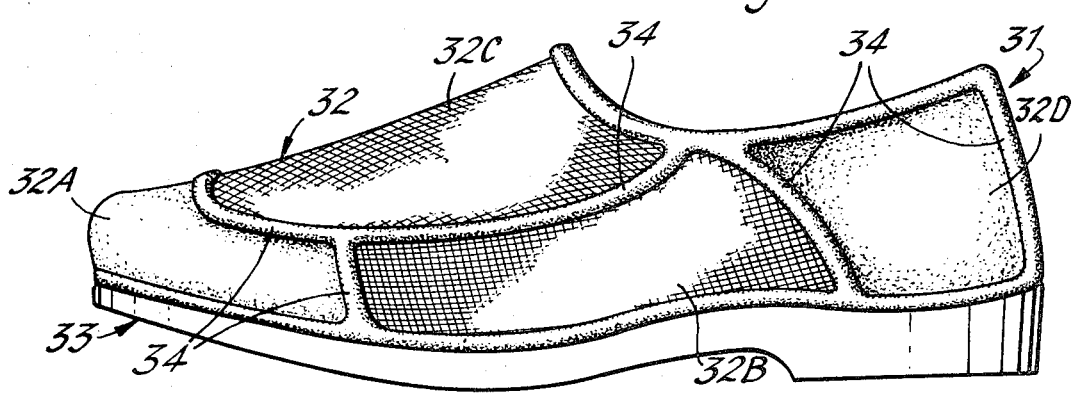
FIG. 9 is a side view of the shoe according to the present invention.

FIG. 9 shows the other embodiment of the article according to the present invention, embodying into a sports shoe 31. The shoe comprises an upper 32 and a sole 33 which is made of similar material to the sole member of the sandal 15. The said upper 32 is consisted of several sections, that is, a toe cap section 32A, side vamp sections 32B, an upper vamp section 32C and counter sections 32D, these sections being inseparably jointed to each other at adjacent edges thereof by elongated connections 34 which are integrally formed with the sole 33. Preferably, the top cap section 32A and the counter sections 32D are formed of relatively strong material such, for example, as natural leather or sheet, reinforcing synthetic resin leather or sheet, or the like, and the vamp sections being made of flexible and porous (meshy) leather or sheet such as woven cloth or the like for ventilation.

Figure 10:
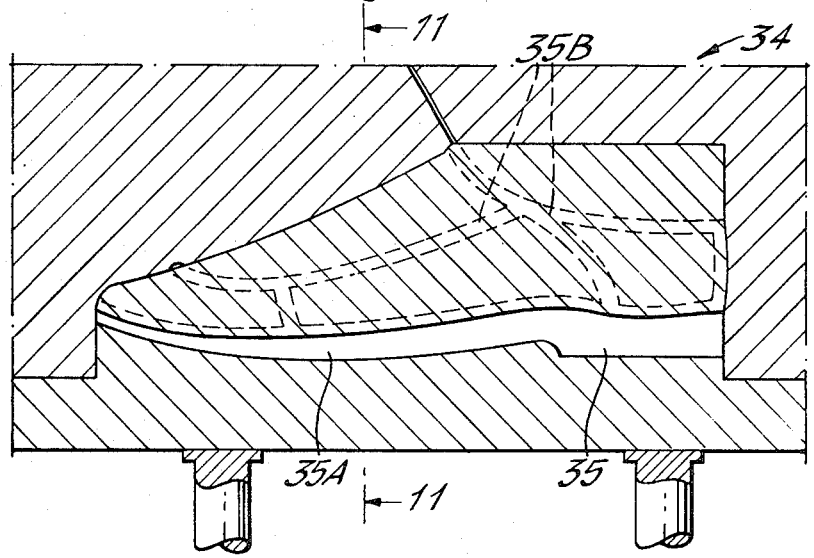
FIG. 10 is a mold adapted for producing the shoe.
Figure 11:
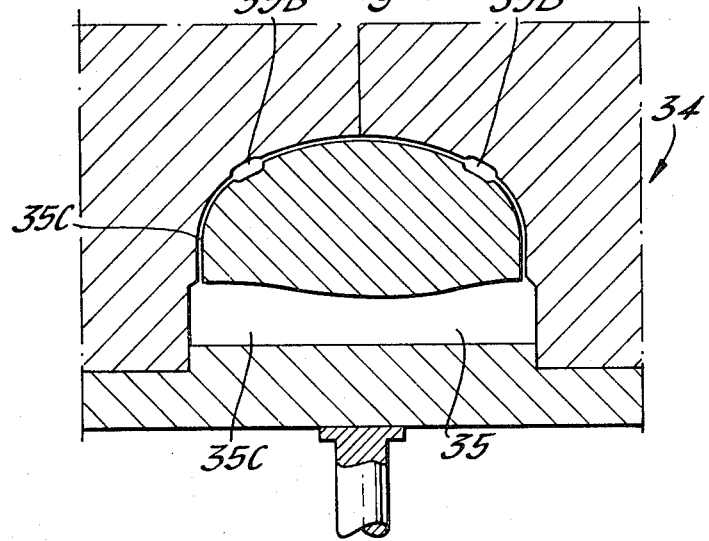
FIG. 11 is a sectional view taken along the line 11—11 in FIG. 10.

FIGS. 10 and 11 show a mold available for producing the shoe illustrated in FIG. 9 in which the mold 34 is provided with a cavity 35. The cavity 35 includes a sole-forming chamber 35A, connection-forming grooves or chambers 35B and spaces 35C for closely inserting the upper sections thereinto. It will be understood that, by using the mold 34 and by processing similar manner to the first embodiment, the shoe 31 illustrated in FIG. 9 may be easily produced.

Further, the method of the present invention is capable of producing a container as shown in FIG. 12 in which the container 40 comprises a bottom plate 41 made of thermoplastic resinous material, vertical pillars 42 made of the same material with the plate 41 and upwardly extending integrally from the each corner of the bottom plate 41, and side walls 43 made of different material from the bottom plate and the pillar such as wooden plate or sheet, steel plate or sheet, synthetic resin plate or sheet, meshy plate or sheet made of said suitable material, or the like, said walls being fixedly supported by the pillars and the bottom plate.

Figure 13:
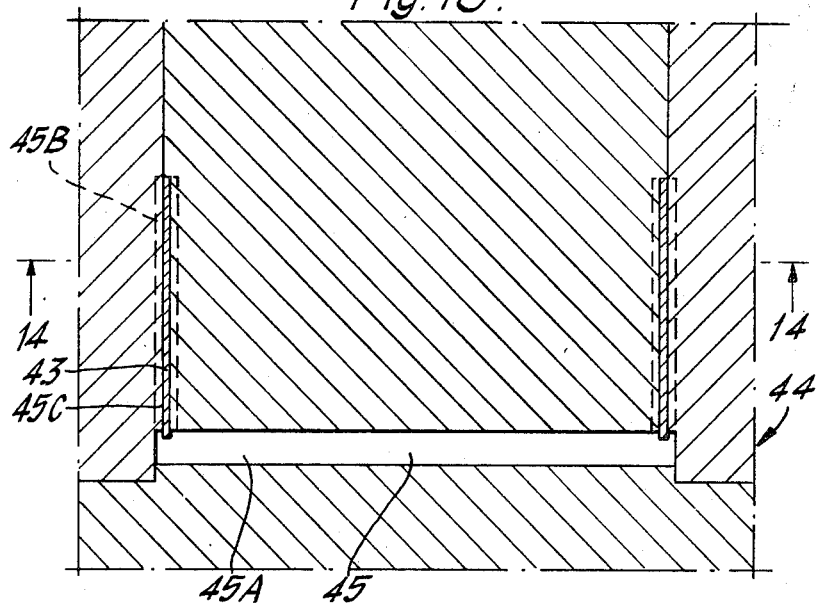
FIG. 13 is a sectional view adapted for producing the container.
Figure 14:
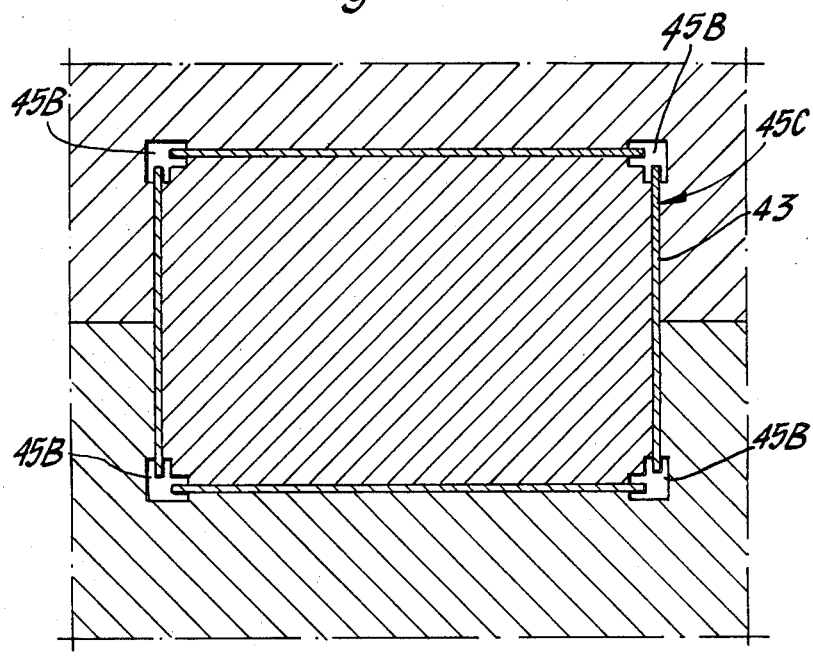
FIG. 14 is a cross-sectional view taken along the line 14—14 in FIG. 13.

FIGS. 13 and 14 show a mold available for producing the container in which the mold 44 is provided with a cavity 45 therein. The cavity 45 includes a bottom-forming chamber 45A, pillar-forming chamber 45B and spaces 45C for closely inserting the side walls 45 thereinto. After the side walls 43 are inserted in the appropriate space as shown in FIGS. 13 and 14, the molten thermoplastic resinous material is injected into the chambers, and then the material being cooled whereby the container formed of several components of different material may be obtained.

Figure 16:
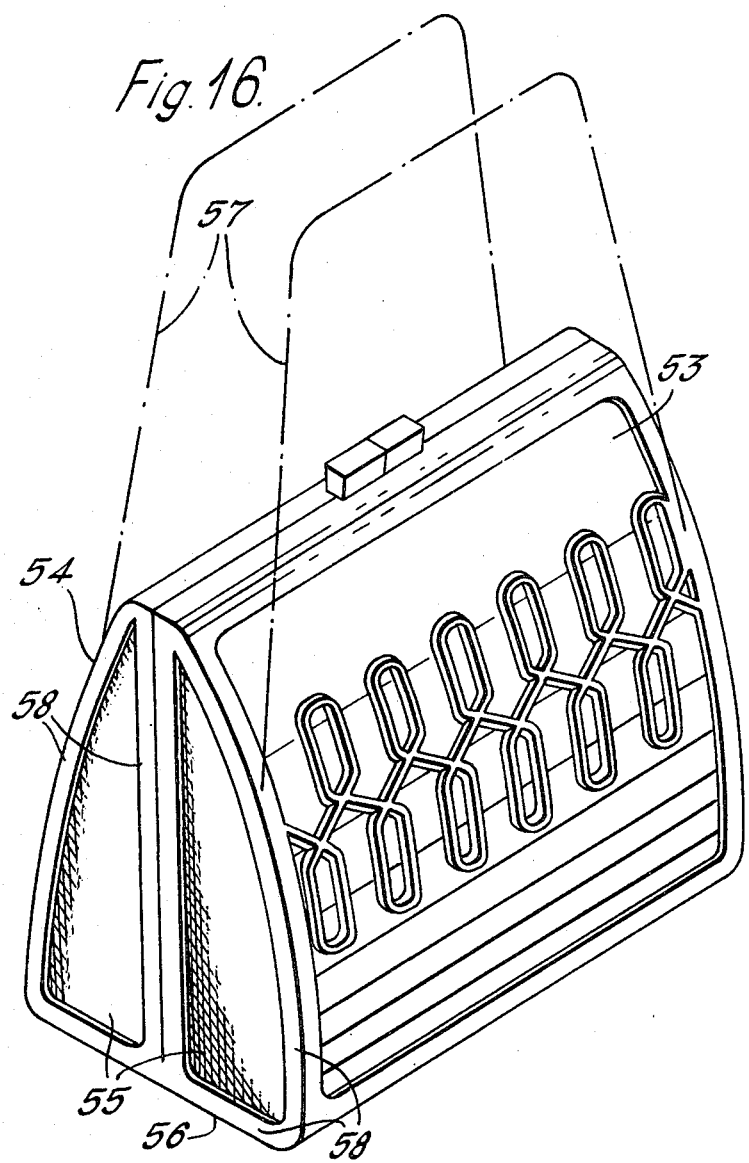
FIG. 16 is a perspective view of the hand-bag according to the present invention.

Some kind of semi-boot is also able to be produced according to the aforesaid method of the subject invention. For example, a semi-boot as shown in FIG. 15 produced by the process comprises an sole 47 and an upper 46 which is provided with a toe cap sections 48 made of reinforcing material such as natural leather or sheet, synthetic resin leather or sheet, or the like, a counter sections 49 made of the same or similar material to said cap sections 48, lateral side sections 50 made of flexible and porous (meshy) leather or sheet such as rough pitched woven or knitted cloth, perforated (porous) synthetic resin sheet or leather, or the like for ventilation, an outer eyelet reinforcement 51 made of suitable material sheet or leather, and said sections 48, 49, 50 and reinforcement 51 being inseparably jointed to each other at adjacent edges thereof by means of connecting members 52 made of thermoplastic resin material and integrally connected to the sole 47. Also, a handbag as shown in FIG. 16 is to be produced according to the aforesaid method of the present invention. And, for example, the said handbag comprises front section 53, rear section 54 which are made of flexible and porous (meshy) leather or sheet such as woven or knitted cloth, skin, haired leather or sheet, synthetic resin leather or sheet, or the like while they may be made of the other leather or sheet as rough pitched woven or knitted cloth, perforated (porous) synthetic resin sheet or leather, or the like, lateral side sections 55 made of same or similar leather or sheet to the sections 53, 54, a bottom member 56 made of suitable conventional sheet or leather, handles 57 and said sections 53, 54, 55 being inseparably joined to each other at adjacent edges thereof by means of connecting members 58 made of thermoplastic resin material and integrally connected to the bottom member 56.

While the present invention has been illustrated and described herein with respect to a preferred embodiment, it is not desired to limit the invention only to the embodiment, but the invention should be considered to include all the substitutes, modifications and equivalents which are encompassed within the essential part of the invention to be set forth in the scope of the underwritten claims and within the scope of the spirit exhibited in the invention of the inventor.

What I claim is:

1. A footwear comprising a molded thermoplastic sole having a pair of sides and an upper member having a pair of of sections of flexible material, one of the sections of the upper member extending into the sole along one side thereof and being secured within the molded sole, the other section of the upper extending into the sole along the other side thereof and being secured within the molded sole, the sections extending upwardly from opposite sides of the sole and toward each other to form a band member, each of the sections having an edge adjacent an edge of the other section, a cover member extending along the inner surfaces of the sections and being spaced from the sections adjacent the adjacent edges thereof, each pair of adjacent edges of the sections being secured by a molded thermoplastic connecting strip surrounding the adjacent edges and extending therebetween and filling the space between the cover member and the sections and securing the cover member to the sections.

2. A footwear comprising an upper member including a plurality of sections and a sole member made of thermoplastic resinous material, said sections being made of flexible material and being integrally connected to each other at adjacent edges thereof by at least one connecting member, an end portion of each section being connected to the edge portion of the sole member, said sole member being provided with an upper surface formed in a curved shape in conformity with the foot of the wearer and being provided with a foamy interior portion adapted for providing resilience and a non-foamy outer later integral therewith adapted for providing durabiltiy and resistance against deformation of the footwear.

3. The footwear of claim 2 wherein said upper is a band member, said band member being provided with a rear cover member inseparably secured onto the back surface of the band member.

* * * * *